O. KROPP.
DEVICE FOR SIGNALING TO AND AUTOMATICALLY STOPPING RUNNING TRAINS.
APPLICATION FILED JUNE 13, 1914.
1,151,194.
Patented Aug. 24, 1915.
2 SHEETS—SHEET 2.
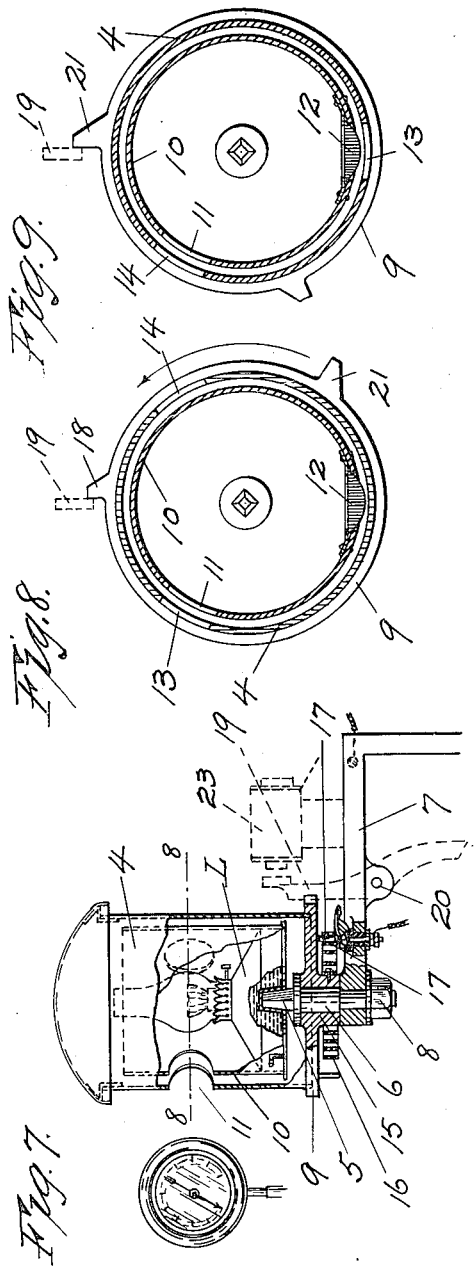
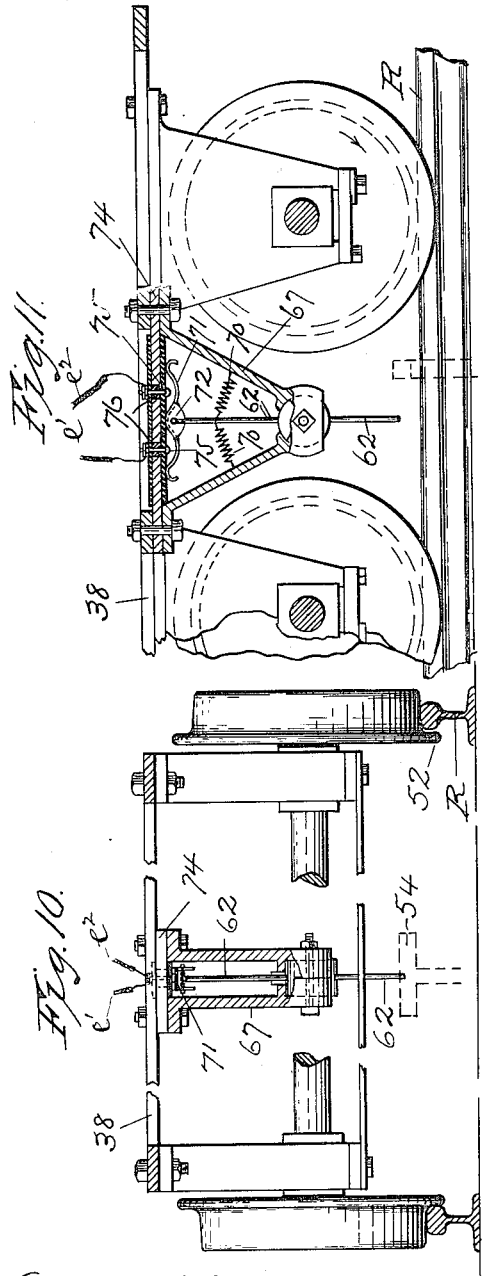
Otto Kropp, Inventor
Witnesses:
Charles C. Abbe
Rachel Lieberman
By Henry Schreiter, his Attorney

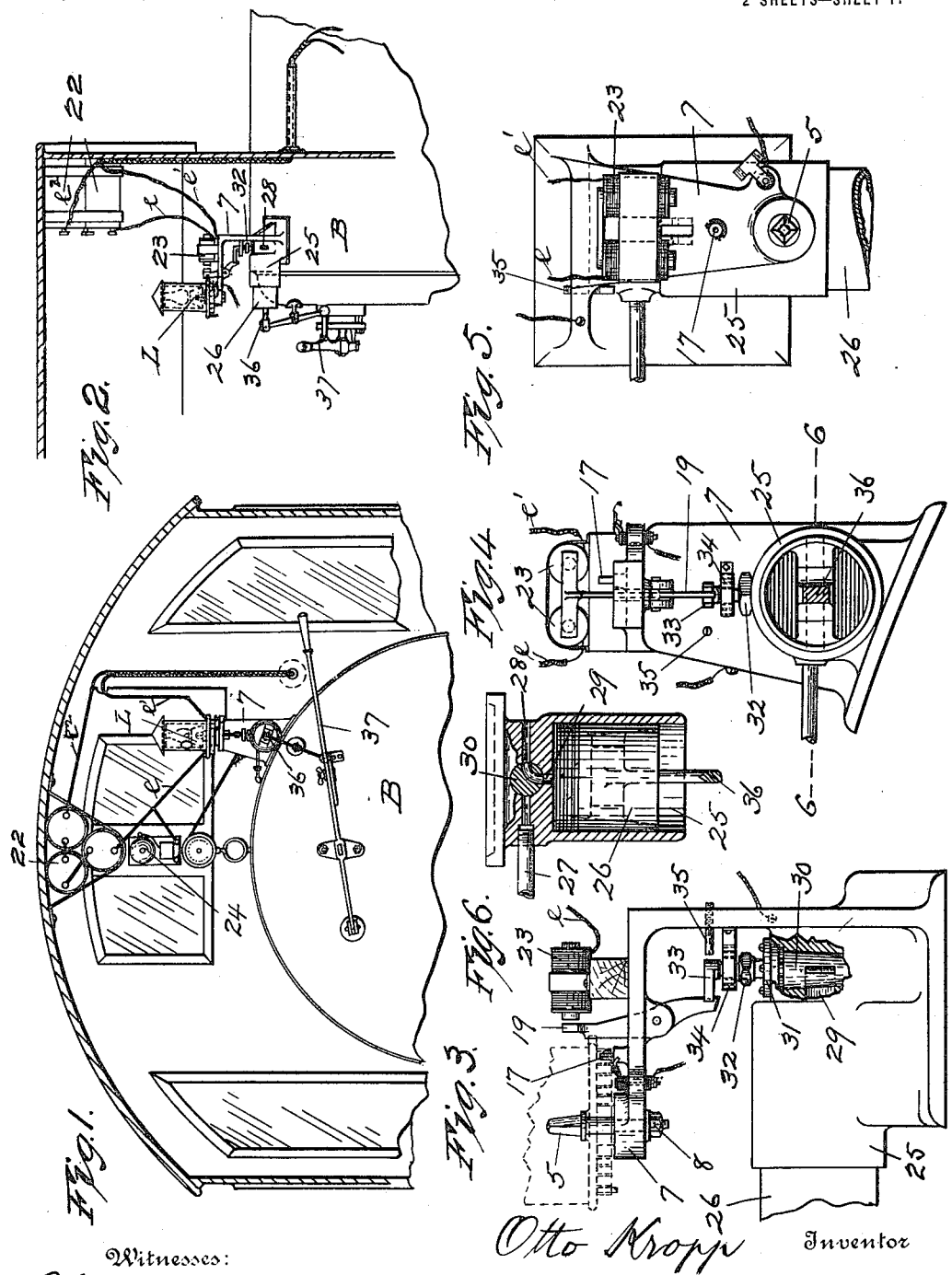

UNITED STATES PATENT OFFICE.

OTTO KROPP, OF WEST HOBOKEN, NEW JERSEY.

DEVICE FOR SIGNALING TO AND AUTOMATICALLY STOPPING RUNNING TRAINS.

1,151,194.   Specification of Letters Patent.   Patented Aug. 24, 1915.

Application filed June 13, 1914.   Serial No. 844,990.

*To all whom it may concern:*

Be it known that I, OTTO KROPP, a citizen of the United States, and resident of West Hoboken, in the county of Hudson and State of New Jersey, have invented certain new and useful Improvements in Devices for Signaling to and Automatically Stopping of Running Trains, the following being a full, clear, and exact specification, reference being had to the accompanying drawings, wherein—

Figure 1 is a fractional front view of the forward end of a locomotive engine cab, showing the location of the parts of the apparatus; Fig. 2 a side view thereof, part of the cab roof and side wall being removed; Fig. 3 is a fractional detail view, showing parts of the device on an enlarged scale, in a similar side view as shown in Fig. 2; Fig. 4 is another fractional detail view, a front view of that shown in Fig. 3; Fig. 5 is also a fractional detail, a plan view of the detail shown in Fig. 3; Fig. 6 is a horizontal sectional view on line 6—6, indicated in Fig. 4; Fig. 7 is a view corresponding to that on Fig. 3, showing details of the arrangements of the lamp, and of the lamp slides, for signaling, and the means of operating the same; Fig. 8 is a cross-sectional view of line 8—8 indicated in Fig. 7, omitting, however, the details of the lamp and showing the lamp slides in their normal position; Fig. 9 is a view similar to Fig. 8, but showing the lamp slides in position when signaling danger; Fig. 10 is a front view, partly sectional view of the engine truck, showing the arrangement of the electrical switching mechanism and Fig. 11 a side view, partly a longitudinal sectional view thereof.

This invention relates to devices and apparatus for operating trains on steam railroads, and consists in devising, and in combining with the steam engine, propelling such trains, and with the railroad track and switches, whereon such trains are run, of devices for visibly and audibly signaling, when the train should be stopped on account of danger ahead, and also of devices for automatically cutting off the supply of steam to the engine, so as to effect the stopping of the train, in case neither the visible, nor the audible, signal should be heeded by the driver of the engine.

The signaling devices are installed in the cab of the engine, substantially as shown in the drawings, and are arranged as follows:

For the visible signaling device, use is made of the lamp L, set up in the cab in its usual place. For this purpose, however, a special socket is provided for the lamp L, and a separate socket for the slide 4, by which the visible signal is produced. The upper end of the stud 6 constitutes the socket for the lamp. It is tapered and squared, and the base of the lamp L is correspondingly recessed, to afford a fixed and suitable support for the lamp. The stud 6 is fixed in the bracket 7 by the flange and the nut 8, screwed on its lower, recessed and screw-threaded end. The bracket 7 is suitably affixed to the outer jacket of the locomotive boiler B. The socket 9, supporting the slide 4, is made in the form of a disk, and is rotatably mounted on the stem of the stud 6. The lamp L is inclosed in an opaque casing 10, wherein two apertures, 11 and 12 are provided, the aperture 11 being plainly transparent, and the aperture 12 being provided with a red colored glass. The movable slide 4 is also opaque, and is provided with two apertures 13 and 14, located to register with the apertures 11 and 12 of the lamp casing. These two apertures 13 and 14 in the slide 4 are made in the form of plain openings. The casing 10 is fixed relatively to the lamp with the apertures 11 and 12 therein, in such position that when the slide 4 is in its normal, or non-signaling, position the light of the lamp will pass through the opening 11 of the casing, and the opening 13 of the slide, the red screened opening 12 of the casing being then covered by the opaque part of the slide.

On the hub 15 underneath the disk part of socket 9, a spiral spring 16 is wound, one end of the spring being secured to the hub, and the other to the pin 17, set in the bracket 7. Spring 16 is set to turn the socket 9 from right to left, and thereby to turn the slide 4 in the same direction. To set and hold the slide 4 in the normal, non-signaling position, a cam-shaped projection 18 is provided on the outer periphery of the socket 9, and a trip lever 19 is pivoted on stud 20, set in the bracket 7, in position to engage the projection 18 with its upper end, and to hold the socket 9 in that position against the action of the said spring. Another cam-shape projection 21 is provided on the periphery of the socket 9 at a point, corresponding ii distance from the projection 18 to the dis tance of the opening 13 from the opening 14 and which is correspondingly equal to the distance of the opening 11, from the red screened aperture 12 in the lamp casing 10. The projection 21 extends farther outwardly than the projection 18, so that it will engage with the upper end of lever 19 when it is withdrawn from its locking position. The spring 16 being set to turn the slide socket 9 from right to left, the latter will be turned by its action, when the upper arm of the trip lever 19 is disengaged, until the projection 21 abuts against it, stopping its further motion. In that position the opening 13 in the slide will stand in front of, and coincide with, the red screened opening 12, in the casing 10 of the lamp. The light from the lamp will then pass through the red screen and thus the red signal will be shown right before the eyes of the engine driver. For the operating of this signal, i.e. withdrawing of the trip lever 19 from its engagement with the projection 18 on the socket 9 of the slide, an electro-magnetic device is provided, consisting of the battery 22, the electro-magnet 23, and of the requisite electric connections, including the circuit closing switch, shown in Figs. 10 and 11, which is designed to be operated by the device installed in, and combined with, the track, and with the switches in the track, whereon the trains are running. The battery 22 supplies, through wires $e$, $e'$ and $e^2$, the requisite electric current to energize the electro-magnet 23, when its circuit is closed. The electro-magnet acting then on the upper arm of the trip lever 19 withdraws it from engagement with the projection 18, thereby releasing the slide socket 9 to turn from right to left under the action of the spring 16. When thus released, the slide socket 9, and the slide 4 fixed thereon, will turn in the stated direction until the projection 21, extending farther out from the periphery of the socket 9, abuts against the upper arm of trip lever 19, whereby its further motion is stopped. The device then stays in this position, displaying the red light danger signal as already explained, until the battery circuit is again interrupted and the socket 9, and the slide 4 fixed thereon, are turned back to their normal position.

As a means for audibly signaling danger by an obstruction on the track, or by an open switch, the bell, or buzzer 24 is provided. This bell may be mounted in any convenient place, preferably as indicated in Fig. 1, in the cab of the engine, and is connected to the same battery circuit. By the shifting of the contact, closing the battery circuit, also the audible signal, the bell or buzzer 24, is set in action simultaneously with the displaying of the visible red signal of the lamp.

The device for automatically cutting off the steam supply to the engine is designed to act upon the lever, by which the engine driver operates the throttle valve. Its action is devised to move the lever, so as to shut off the steam supply to the engine. For this purpose the cylinder 25 is mounted at the base of bracket 7, and a trunk piston 26 (see Figs. 4 and 6) is steam tightly fitted therein. The rear end of the cylinder 25 is closed, and an inlet port 27, connected by a pipe with the boiler of the engine, and the exhaust port 28, (see Fig. 6) are provided therein. Both ports communicate with the interior of the cylinder through the port 29 located midway between; the communication being controlled by a two-way cock, or valve 30, set in the intersecting point of the ports. The stem of the valve 30 extends through the plate 31 and the stuffing box 32, and a crank 33 is firmly secured to its end. Between the stuffing box 32 and the crank 33 there is secured to the stem of the valve 30 the coiled spring 34, whose other end is affixed to the bracket. Spring 34 is wound and set to turn the valve 30 in the direction of the hands of a watch, and the pin 35, set in the bracket 7 in position to engage with the crank 33, serves to stop the motion when the valve 30 is brought into the position in which the port 27 is connected with the inlet port 29 of the cylinder. The connecting rod 36 connects the piston 26 with the lever 37, through intervening levers to operate the throttle valve lever of the engine so that when the piston 26 is driven outwardly the lever 37 is moved to act on the throttle valve to shut off the steam supply to the engine.

Normally, the valve 30 is held in the position shown in Fig. 6. in which the port 29 communicates with the exhaust port 28, by the crank 33 engaging with the downwardly depending arm of the trip lever 19. The trip lever 19 is also acting as a locking device for locking the slide socket 9, as explained above, to hold it in its normal position, and is devised to have its dependent arm release the crank 33 when the electro-magnet 23 withdraws its other arm from the engagement with the slide socket 9. Thus at the moment when the electro-magnet 23 is energized by the closing of the battery circuit, the signaling devices and the lever operating the throttle valve of the engine are set in action. The closing of this battery circuit is effected by the device shown in Figs. 10 and 11 drawn on an enlarged scale. The device is secured forwardly to the bottom part of the locomotive engine, preferably to the frame of the forward truck.

The electric conduit wires $e'$ and $e^2$ of the battery circuit connecting the electro-magnet 23, and the bell, or buzzer 24 are connected to the terminals 75, set in insulating bushings 76. The terminals 75 project through the plate 74 to its under side, and are formed in the shape of buttons. A bracket 67 is secured to the under side of the bolster plate so as to depend from it, as shown in Fig. 11, and the two-arm lever 62 is mounted in a suitable pivotal bearing provided in the apex thereof. A metallic spring 71, formed as shown in Fig. 11, is affixed to the upwardly projecting arm of the lever 62, by means of the insulating socket 72. The bends of the spring 71 are so dimensioned that the distances between the apexes thereof correspond exactly to the distance between the terminals 75, and springs 70 maintain the lever 62 in the position, shown in Fig. 11, and the battery circuit interrupted, but when the lever 62 is swung to either side, the metallic spring 71 is brought in contact with the termini 75, and the battery circuit is closed, the swing of the lever 62 being arrested by the abutting of the coiled ends of spring 71 against the arms of the bracket 67, when the apexes of the bends of the spring 71 are in contact with the termini 75. By these means a secure closing of the battery circuit is effected whenever the downwardly depending arm of the lever 62 abuts against an obstruction in its path.

To effect such closing of the battery circuit wherever and whenever it is desired to signal to the engine driver, and to eventually stop the engine, the devices for raising trip levers like the one indicated in dotted lines and designated 54 in Figs. 10 and 11 are set up along the railroad track at suitable intervals. When the forward truck of the engine of the train reaches the point where the trip lever 54 is set up, the downwardly depending arm of lever 62 abuts against it, whereby its upwardly projecting arm is swung to the right, shifting the spring 71 in contact with the terminals 75 of the battery circuit, closing it, and setting the signaling, etc., device on the engine in action. To guard against collisions and wrecks by a misplaced or thrown switch, and for similar purposes, the apparatus for raising such a trip lever in the path of the engine may be combined with the switch, so that it will be actuated thereby. The apparatus and the manner of combining it with the railroad track, and with a switch, are shown and described in my sub-divisional application, Sr. No. 867,852, filed October 21, 1914, to which reference is made for information on this subject.

The hereinbefore described devices and their combination with the locomotive engine and with the railroad track are designed to operate so as to eliminate the human element as a factor in running trains, or rather to insure safety, without depending wholly upon the attention and activity of the engine driver.

I claim as my invention:

1. A signaling device for locomotive engines comprising a lamp, fixedly mounted in the cab of the engine; an opaque casing provided with one plain aperture and one provided with a colored pane fixed relatively to and surrounding the lamp, a disk, rotatably mounted on the support of the lamp and provided with abutments; an opaque slide having two apertures in positions registering with the apertures in the lamp casing; a spring operatively connected with the disk and tending to turn it in one direction; a metallic lever, pivotally mounted in position to engage the abutments on the disk and to hold it in predetermined position; an electro-magnet, set in proximity to the metallic lever, an electric battery, a normally interrupted electrical circuit connecting with the winding of the electro-magnet and with the battery; means for closing the electrical circuit, a lever pivotally mounted underneath the engine, and operatively connected with the movable element of the circuit closer; and means, adapted to be set up, in the path of the engine, in position to engage the lever and to cause it to move to close the electrical circuit; substantially as herein shown and described.

2. A device for automatically operating the throttle valve of a locomotive engine, comprising a casing, a cylinder in the casing, a piston fitted in the cylinder, means connecting the lever operating the throttle valve with the piston to cause the throttle valve to be closed by the outward motion of the piston; an inlet and an exhaust port, and a duct connecting the cylinder therewith; a conduit connecting the inlet port with the steam space of the boiler of the locomotive, a valve seat in the intersecting point of the duct with the said ports; a two-way valve, turnably set therein and having its stem extended through, and above, the casing; means operatively connected with the stem for turning the valve in the position connecting the duct into the cylinder with the inlet port; a crank affixed to the stem of the valve, a double-armed lever pivoted in position to engage with the crank when the valve is in the position connecting the duct into the cylinder with the exhaust port; an electro-magnet set in position to act on the double-armed lever to withdraw it from its engagement with the crank; an electric battery, a normally interrupted electrical circuit connecting with the winding of the electro-magnet and with the battery; means for closing the electrical circuit, a lever pivotally mounted underneath the engine and operatively connected with the movable element of the circuit closer; and means, adapted to be set up, in position in the path of the engine, to engage the said lever and to cause it to move to close the electrical circuit, substantially as herein shown and described.

3. A combined signaling and automatic stopping device for locomotive engines, comprising a lamp fixedly mounted in the cab of the engine; an opaque casing provided with one plain aperture, and one provided with a colored pane, fixed relatively to and surrounding the lamp; a disk rotatably mounted on the support of the lamp and provided with abutments; an opaque slide having two apertures in positions registering with the apertures in the lamp casing; a spring operatively connected with the disk and tending to turn it in one direction; a casing, a cylinder in the casing, a piston fitted in the cylinder, means connecting the lever operating the throttle valve with the piston to cause the throttle valve to be closed by the outward motion of the piston; an inlet and an exhaust port, and a duct connecting the cylinder therewith; a conduit connecting the inlet port with the steam space of the boiler of the locomotive, a valve seat in the intersecting point of the duct with the said ports; a two-way valve, turnably set therein and having its stem extended through, and above, the casing; means operatively connected with the stem for turning the valve in the position connecting the duct into the cylinder with the inlet port; a crank affixed to the stem of the valve, a double-armed lever mounted in position to engage with one arm the crank affixed to the valve stem, so as to hold the valve in the position connecting the duct into the cylinder with the exhaust port, and to engage with its other arm the abutments on the disk, to hold the disk in position, in which the slide obstructs the signal; an electro-magnet, set up to draw, when energized, the double-armed lever out of engagement with the abutment of the disk, and with the crank on the stem of the valve; an electric battery, a normally interrupted electrical circuit connecting with the winding of the electro-magnet and with the battery; means for closing the circuit; a lever pivotally mounted underneath the engine and operatively connected with the movable element of the circuit closing means, and means, adapted to be set up, in the path of the engine, in position to engage the lever and to cause it to move to close the electrical circuit; substantially as herein shown and described.

OTTO KROPP.

Witnesses:
WILLIAM L. TUFTS,
RACHEL LIEBERMAN.

Copies of this patent may be obtained for five cents each, by addressing the "Commissioner of Patents, Washington, D. C."